US012084823B2

(12) United States Patent
Shin et al.

(10) Patent No.: US 12,084,823 B2
(45) Date of Patent: Sep. 10, 2024

(54) FLOOR-TYPE WALKING SIGNAL DEVICE

(71) Applicant: AMOSENSE CO., LTD., Cheonan-si (KR)

(72) Inventors: Gyuweon Shin, Cheonan-si (KR); Daehwan Kim, Cheonan-si (KR)

(73) Assignee: AMOSENSE CO., LTD., Cheonan-si (KR)

( * ) Notice: Subject to any disclaimer, the term of this patent is extended or adjusted under 35 U.S.C. 154(b) by 0 days.

(21) Appl. No.: 18/290,267

(22) PCT Filed: May 10, 2022

(86) PCT No.: PCT/KR2022/006607

§ 371 (c)(1),
(2) Date: Nov. 10, 2023

(87) PCT Pub. No.: WO2022/240112

PCT Pub. Date: Nov. 17, 2022

(65) Prior Publication Data

US 2024/0240418 A1 Jul. 18, 2024

(30) Foreign Application Priority Data

May 13, 2021 (KR) ........................ 10-2021-0061953

(51) Int. Cl.
*E01F 9/547* (2016.01)
*E01F 9/559* (2016.01)
(Continued)

(52) U.S. Cl.
CPC .............. *E01F 9/547* (2016.02); *E01F 9/559* (2016.02); *F21S 8/022* (2013.01); *F21V 7/0083* (2013.01);
(Continued)

(58) Field of Classification Search
CPC . F21S 8/022; F21S 8/032; E01F 9/547; E01F 9/559; E01F 9/582
See application file for complete search history.

(56) References Cited

U.S. PATENT DOCUMENTS 6,602,021 B1 * 8/2003 Kim ........................ E01F 9/559 116/63 R
8,240,879 B2 * 8/2012 Hsu ........................... F21V 7/04 362/240
(Continued)

FOREIGN PATENT DOCUMENTS

KR 10-1905794 B1 12/2018
KR 10-2061027 B1 2/2020
(Continued)

OTHER PUBLICATIONS

KR Office Action dated Jul. 12, 2021 as received in Application No. 10-2021-0061953.
(Continued)

*Primary Examiner* — Matthew J. Peerce
(74) *Attorney, Agent, or Firm* — Maschoff Brennan

(57) ABSTRACT

The present invention provides a floor-type walking signal device for installation in which the device is buried in the ground between a road and a sidewalk, comprising a reflector having a plurality of reflective surfaces respectively corresponding to a plurality of LED elements. The present invention can prevent the luminance from being lowered by using the reflector, even if the distance between light-emitting surfaces and the LED elements is relatively long, and can improve the luminance uniformity on the light exit surfaces.

16 Claims, 12 Drawing Sheets

(51) Int. Cl.

| | |
|---|---|
| ***F21S 8/02*** | (2006.01) |
| ***F21V 7/00*** | (2006.01) |
| ***F21V 23/00*** | (2015.01) |
| ***F21V 31/00*** | (2006.01) |
| ***F21Y 115/10*** | (2016.01) |

(52) U.S. Cl.
CPC .......... *F21V 23/001* (2013.01); *F21V 31/005* (2013.01); *F21Y 2115/10* (2016.08)

(56) References Cited

U.S. PATENT DOCUMENTS

2007/0070618 A1* 3/2007 Talamo ..................... E01F 9/20 362/240
2012/0307495 A1* 12/2012 Shih ................... G02B 19/0066 362/237

FOREIGN PATENT DOCUMENTS

KR 10-2108789 B1 5/2020
KR 10-2133975 B1 7/2020
KR 10-2210147 B1 2/2021
KR 10-2335546 B1 12/2021

OTHER PUBLICATIONS

KR Decision to Grant Dated Sep. 8, 2021 as received in Application No. 10-2021-0061953.

* cited by examiner

[FIG. 1]
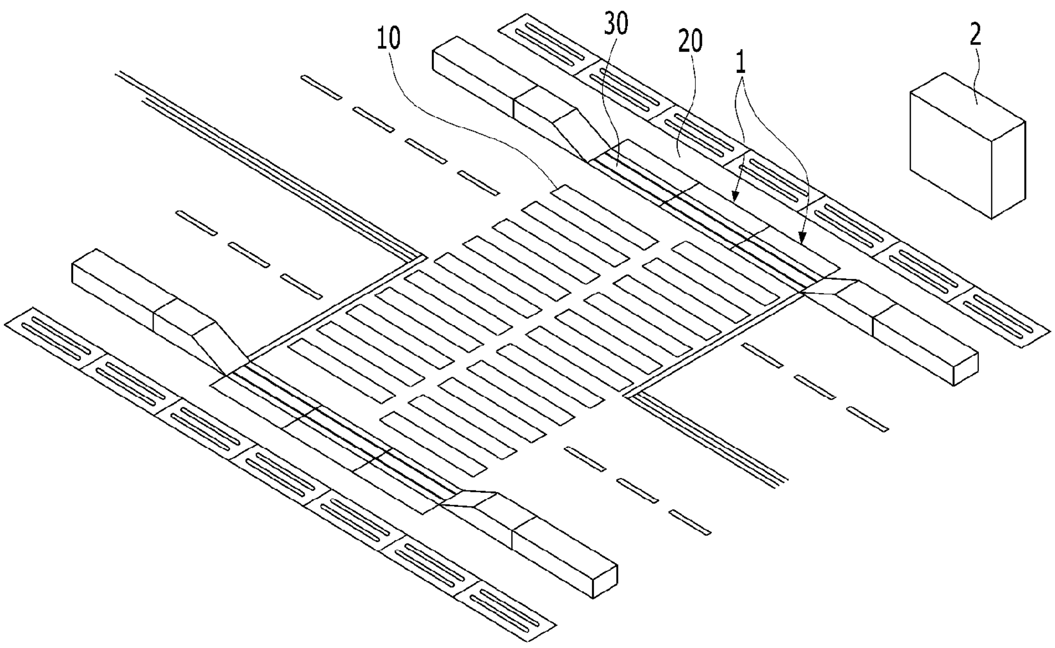

[FIG. 2]
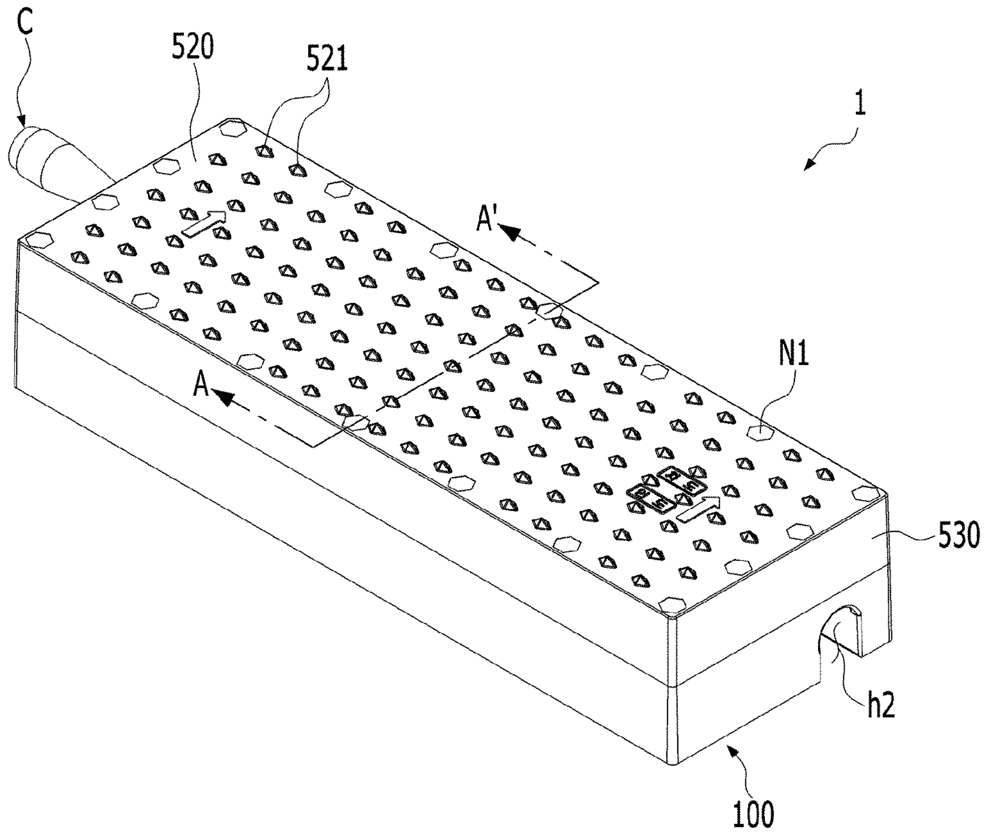

[FIG. 3]
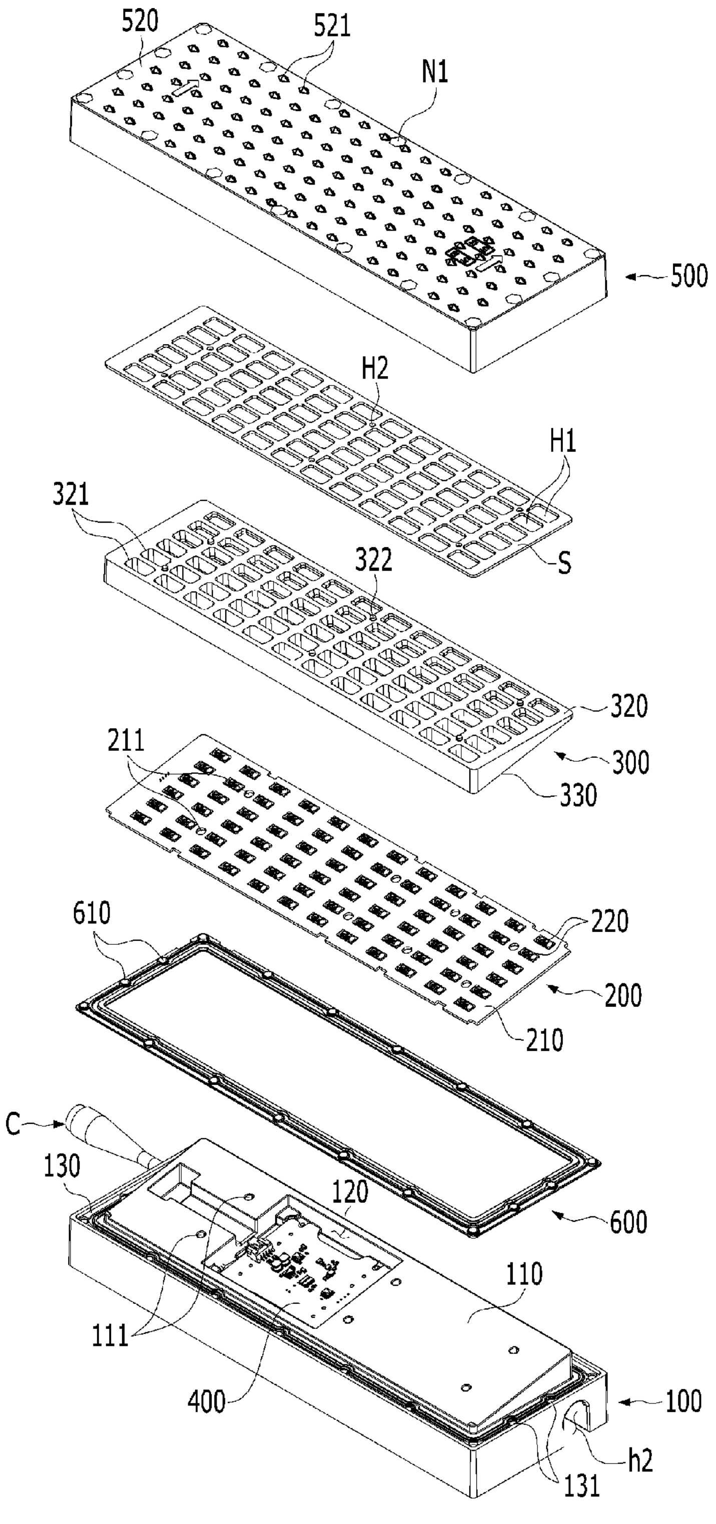

[FIG. 4]
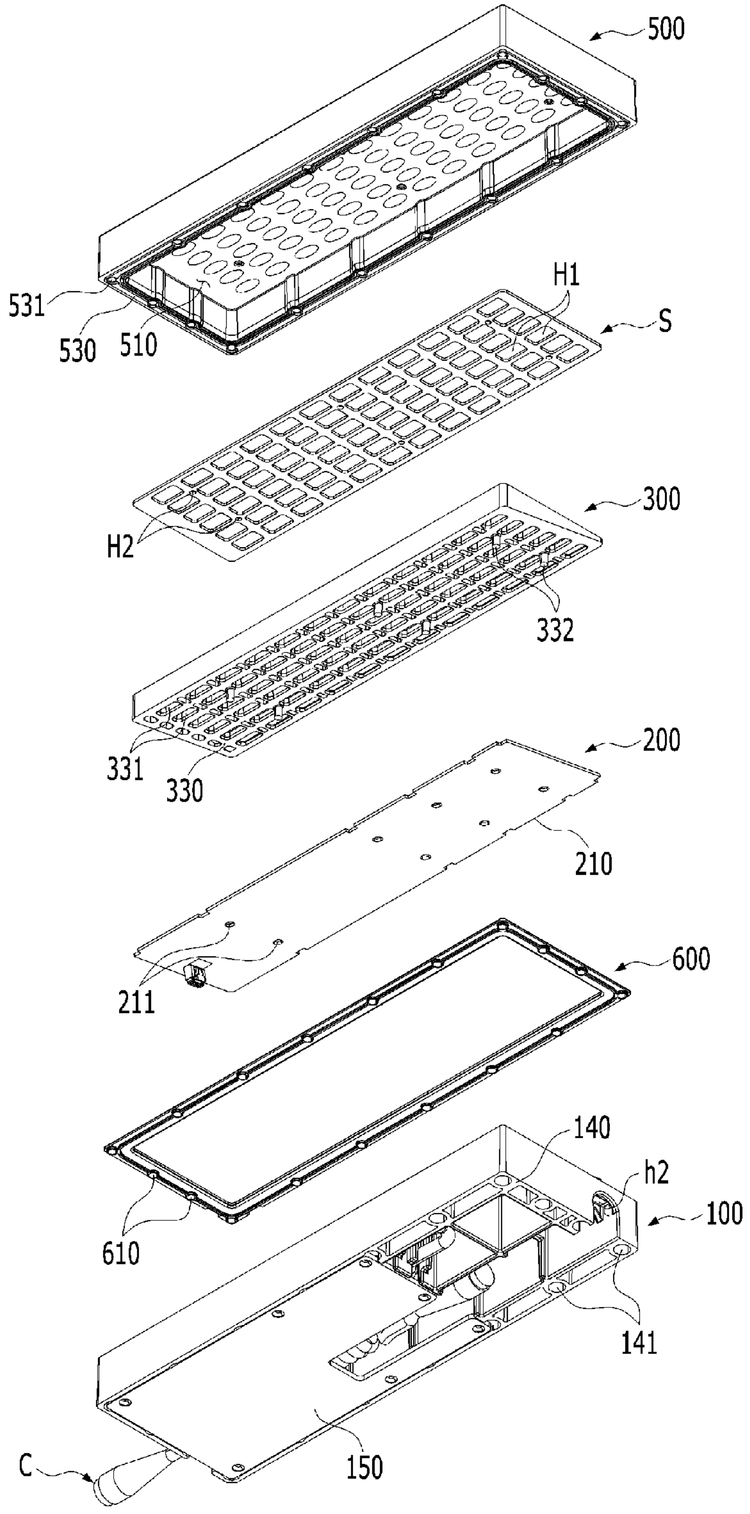

[FIG. 5]
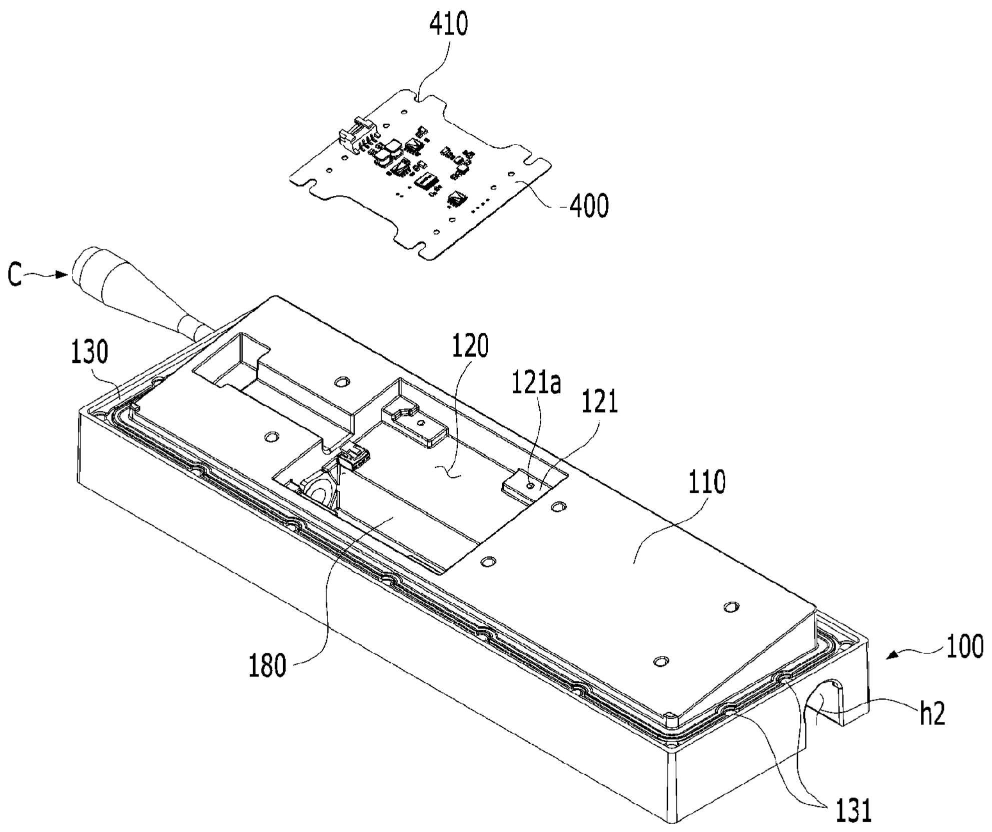

[FIG. 6]
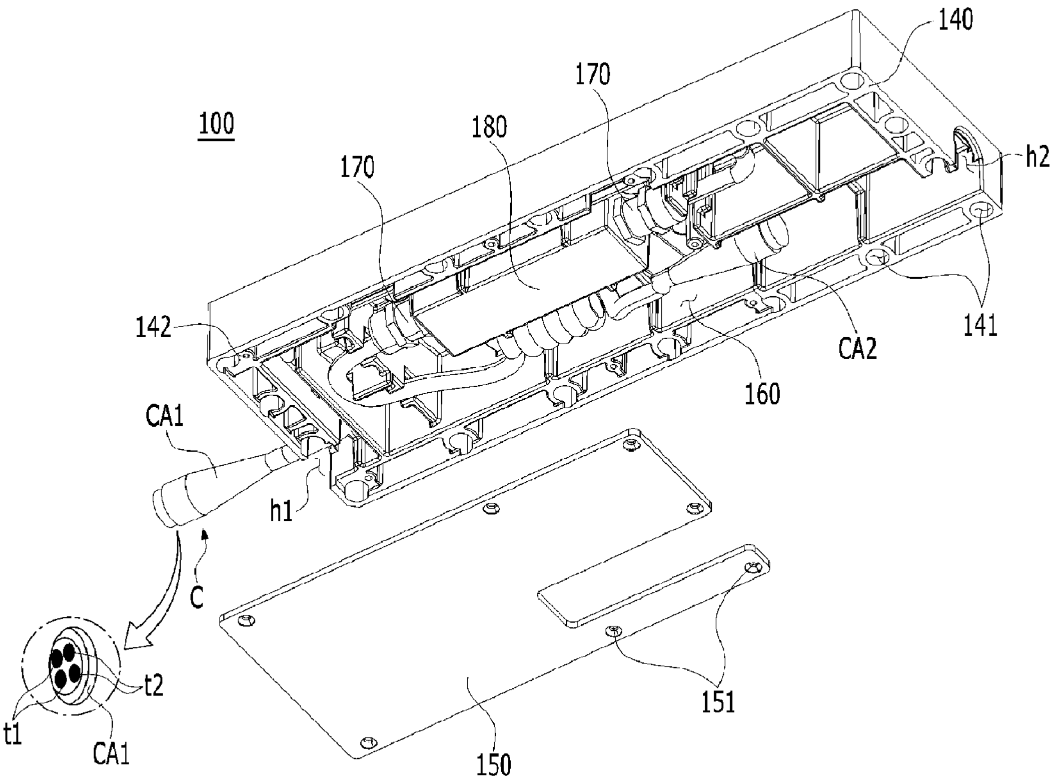

[FIG. 7]
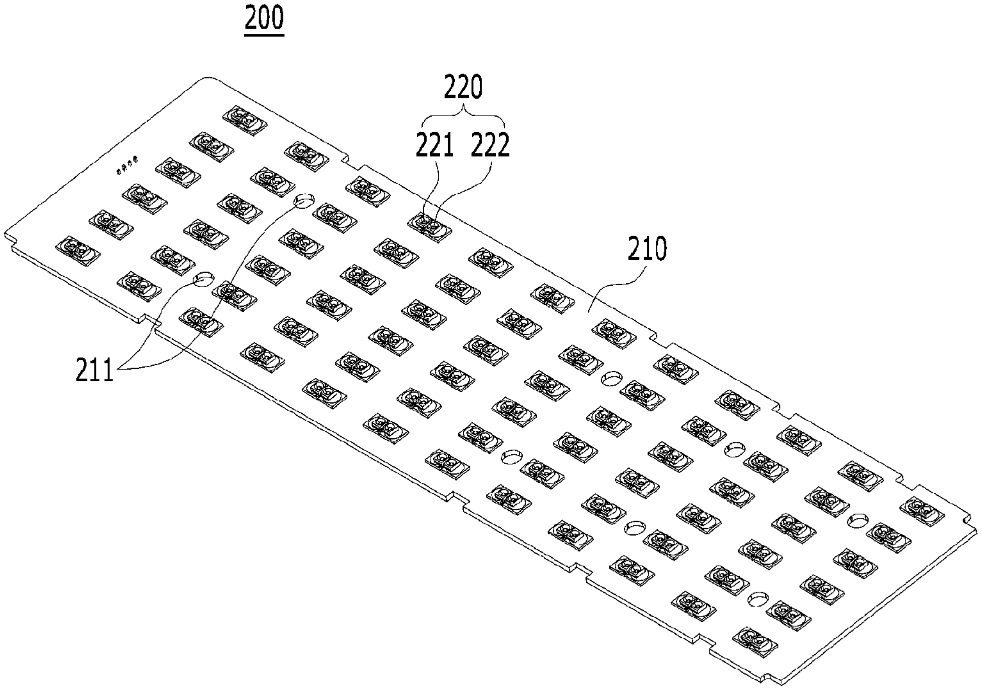

[FIG. 8]
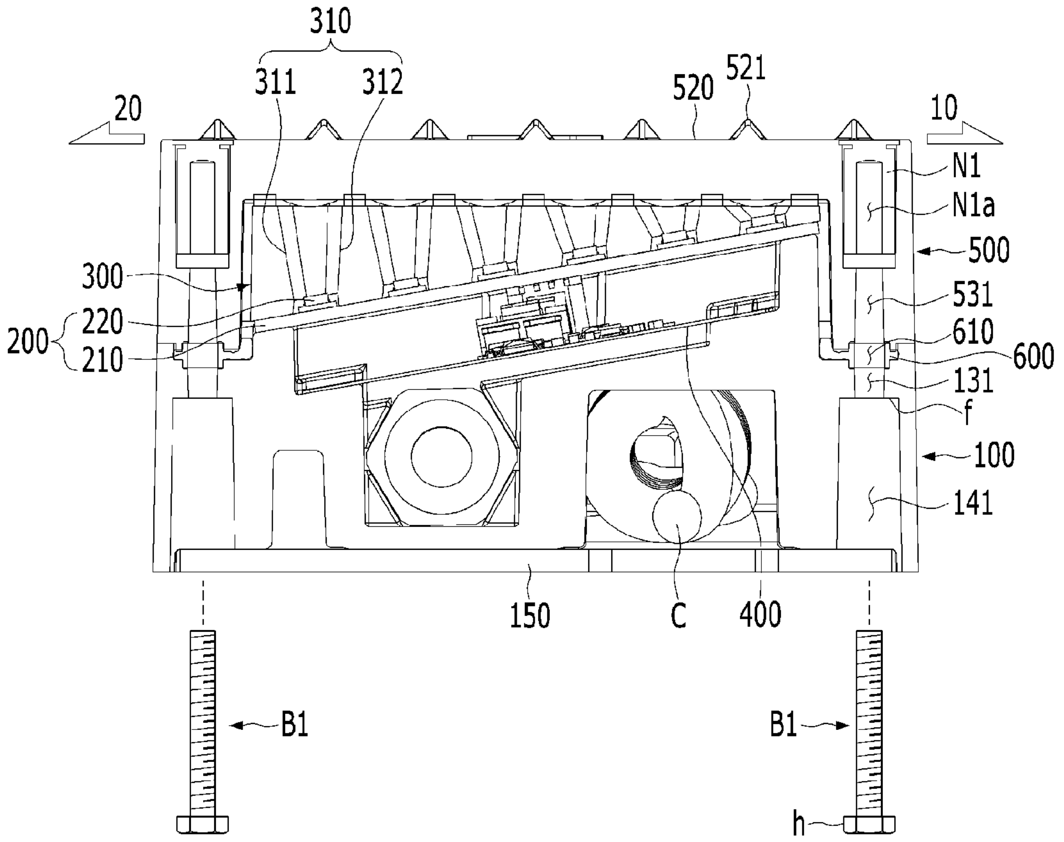

[FIG. 9]
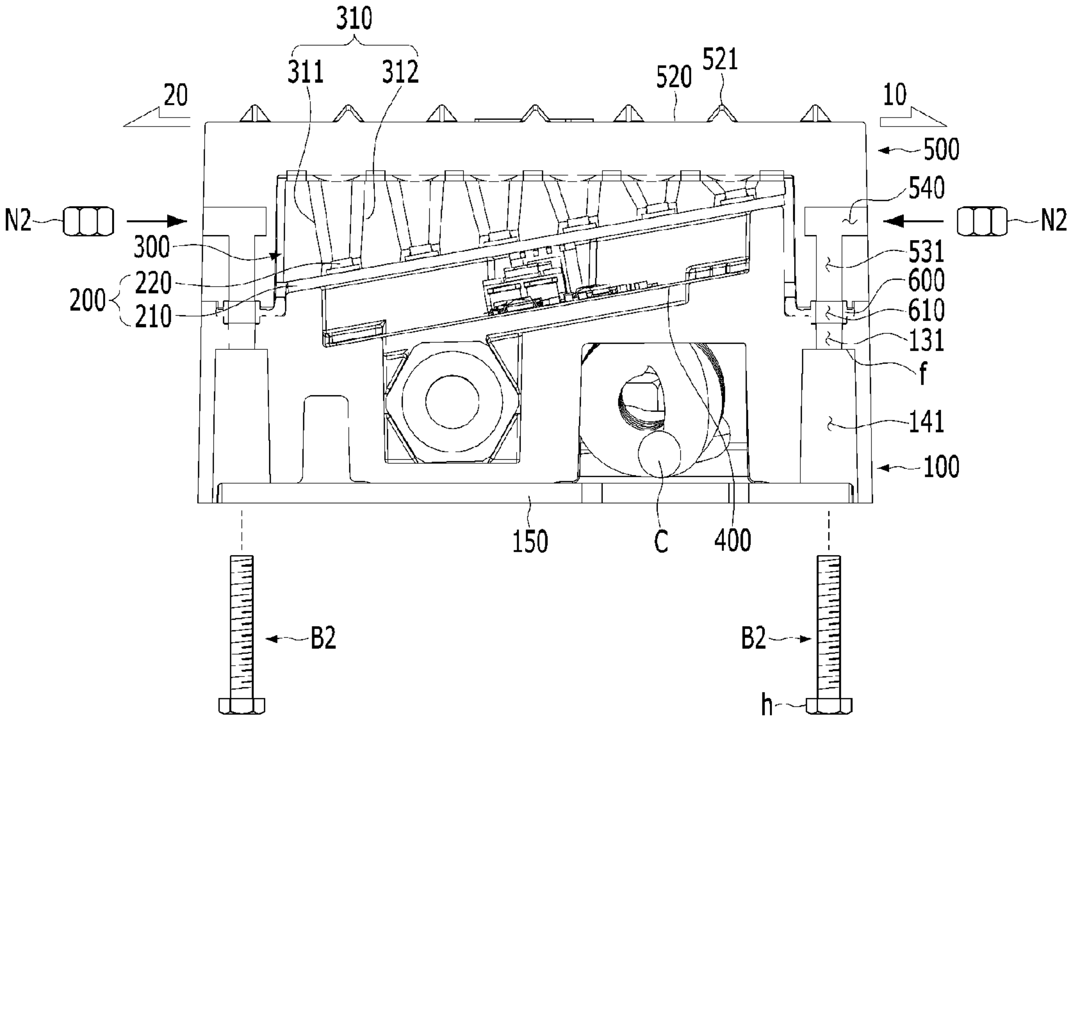

[FIG. 10]
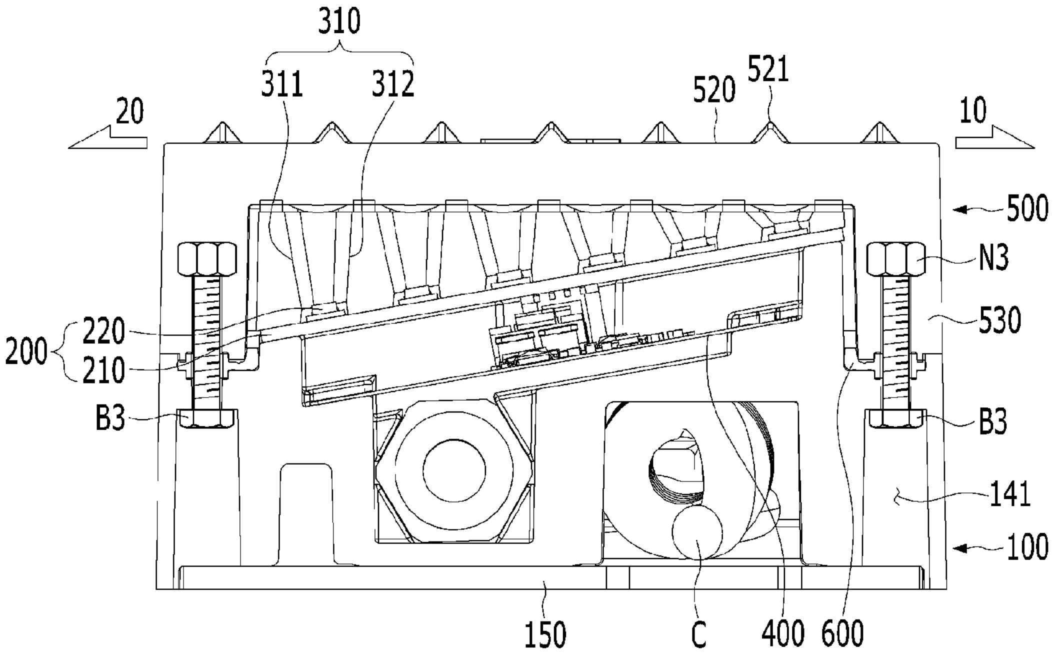

[FIG. 11A]
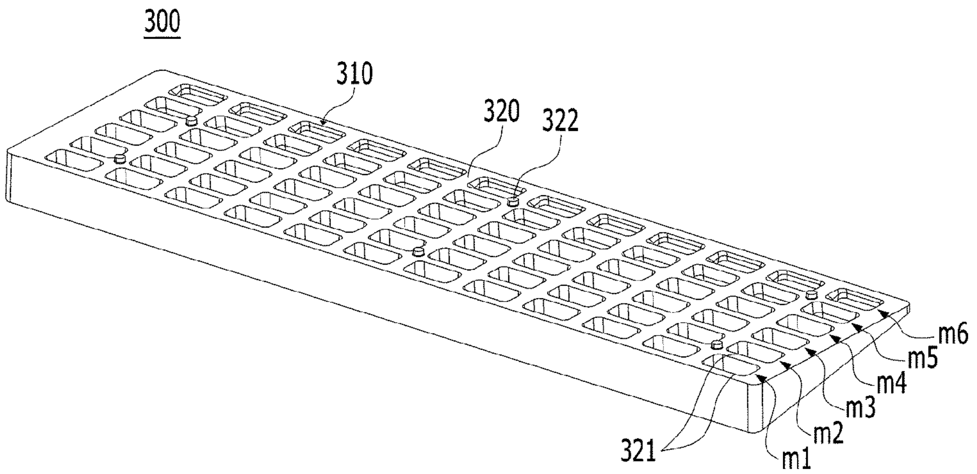
[FIG. 11B]
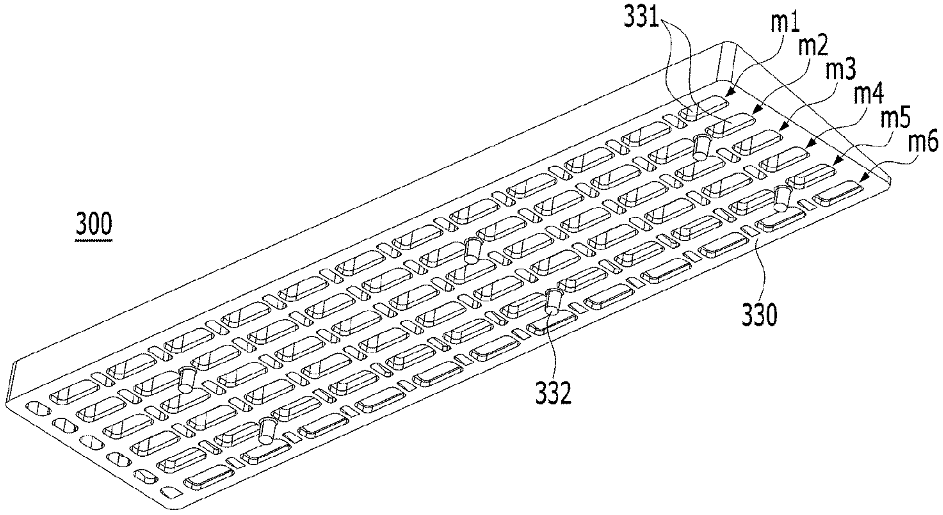

[FIG. 12]
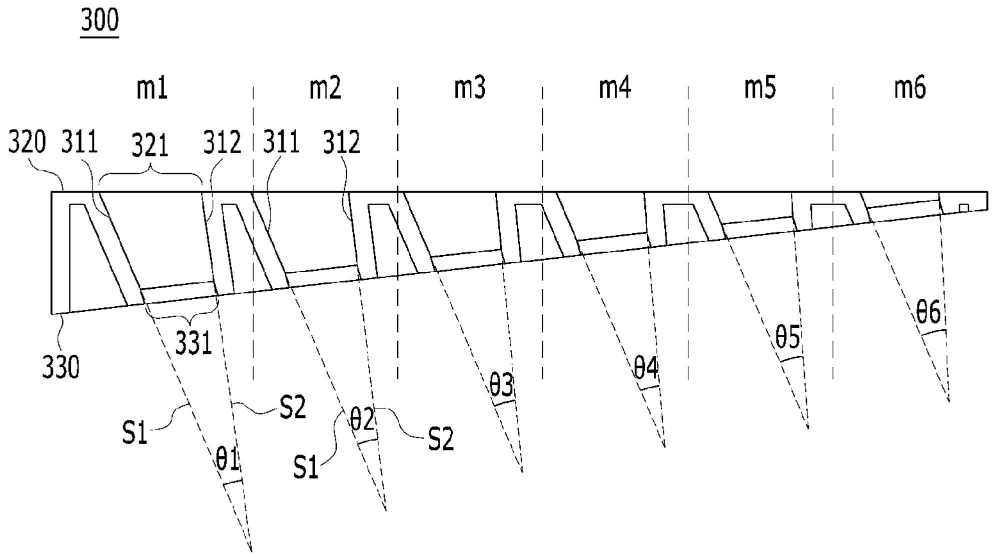
[FIG. 13]
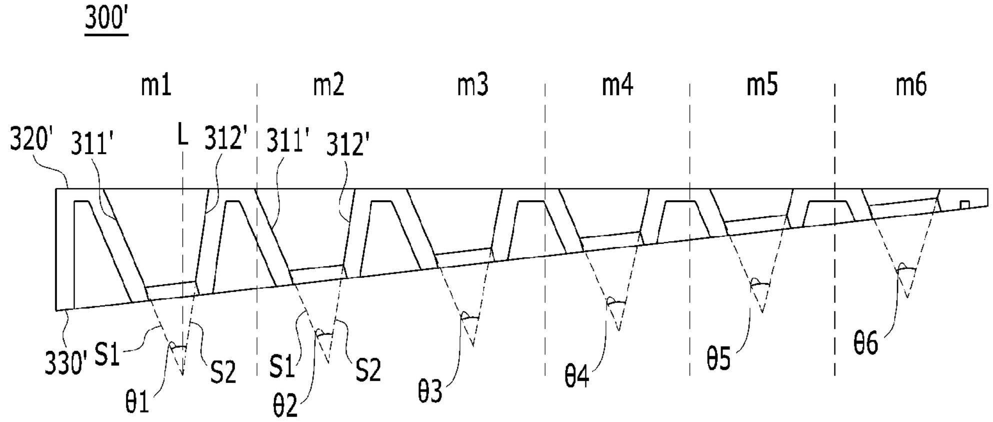

FLOOR-TYPE WALKING SIGNAL DEVICE

TECHNICAL FIELD

The present disclosure relates to a floor-type walking signal device, and more specifically, to a floor-type walking signal device that improves visibility to pedestrians.

BACKGROUND ART

A floor-type walking signal device is buried in the ground such as a road and emits signaling light through an upper surface thereof. The floor-type walking signal device is highly evaluated for effectiveness because it may be positioned in a gaze direction while providing a function of a stop line or a guide line to pedestrians. In particular, there is an advantage in that it is possible to easily provide signal information to pedestrians in line with the recent increase in the number of pedestrians walking while looking at their smartphones.

However, unlike traffic lights installed on pillars, the floor-type walking signal device is buried in the ground, such as a concrete or an asphalt, and the upper surface thereof should constantly withstand loads and impacts from pedestrians, motorcycles, and in some cases, vehicles and the like and may be submerged in snow or rainwater in precipitation or snowfall situations. As described above, the floor-type walking signal device has a poor installation environment and should operate stably for a long time.

In addition, the floor-type walking signal device should maximize visibility to pedestrians while minimizing a driver's driving interference. The floor-type walking signal device installed at the border between a road (crosswalk) and a sidewalk usually displays three signals: red, green, and green flashing, and it is preferable to minimize these signals because they may cause visual obstruction or confusion to drivers of vehicles.

SUMMARY OF INVENTION

Technical Problem

The present disclosure is directed to providing a floor-type walking signal device, which may include a reflector having a reflective surface for improving luminance uniformity on a light-emitting surface, thereby improving visibility to pedestrians while minimizing a driver's driving interference.

Solution to Problem

In order to achieve the object, a floor-type walking signal device installed by being buried in the ground between a road and a sidewalk according to an embodiment of the present disclosure includes a body unit including a base surface inclined upward from one side to the other side, a light emitting diode (LED) module which is installed on the base surface of the body unit and on which a plurality of LED devices configured to generate signaling light are disposed in a matrix, and a reflector disposed on an upper portion of the LED module and including a plurality of reflective surfaces corresponding to each of the plurality of LED devices, wherein the plurality of reflective surfaces are classified in a unit of column and separately defined as first to $n^{th}$ (n is a natural number) column reflective surface groups sequentially from a position close to one side to a position far from the one side, each of the first to $n^{th}$ column reflective surface groups includes a first wall surface and a second wall surface disposed at intervals in a width direction of the reflector, a first virtual line extending downward from the first wall surface and a second virtual line extending downward from the second wall surface form a virtual angle at an intersection point, and at least two of the first to $n^{th}$ column reflective surface groups have different virtual angles, and as the column reflective surface group is closer to the one side, the virtual angle is formed to be smaller.

Each of the first to $n^{th}$ column reflective surface groups may be formed to have a different virtual angle.

Open upper end portions of the first to $n^{th}$ column reflective surface groups may be all formed to have the same area, and open lower end portions of the first to $n^{th}$ column reflective surface groups may be all formed to have the same area.

Open upper end portions of the first to $n^{th}$ column reflective surface groups may be all formed to have the same width, and open lower end portions of the first to $n^{th}$ column reflective surface groups may be all formed to have the same width.

The first wall surface and the second wall surface of each of the first to $n^{th}$ column reflective surface groups may be inclined in a direction that moves away upward with respect to a vertical line passing through the open upper end portion and lower end portion of each of the first to $n^{th}$ column reflective surface groups.

A lower surface of the reflector may be formed as an inclined surface corresponding to the base surface of the body unit, the lower surface of the reflector and the base surface may be disposed to face each other, and an upper surface of the reflector may be disposed horizontally.

The floor-type walking signal device may further include a cover unit coupled to an upper edge of the body unit and accommodating the reflector and an upper portion of the body unit, a gasket interposed between an upper edge of the body unit and a lower end of the cover unit and configured to block the introduction of external moisture, and a buffering sheet interposed between an inner surface of the cover unit and an upper surface of the reflector and configured to perform a buffering operation.

A plurality of anti-slip protrusions may be formed to protrude from an upper surface of the cover unit.

The cover unit may include a nut on a side wall thereof, the body unit may be formed with a plurality of first insertion holes at intervals along a circumference of an upper edge thereof and a plurality of second insertion holes at intervals along a circumference of a lower edge thereof, and a bolt fitted into the second insertion hole of the body unit may be fastened to the nut of the cover unit by passing through the first insertion hole.

The first insertion hole may be formed to have a smaller diameter than the second insertion hole to form a stepped surface therebetween, and a head portion of the bolt may be supported by the stepped surface between the first insertion hole and the second insertion hole.

The cover unit may include a nut fitting groove formed in the side wall thereof, and the nut may be fitted into the nut fitting groove in a horizontal direction so that a nut hole at the center may be located at a position corresponding to the first insertion hole.

Signaling light generated from each of the plurality of LED devices may be emitted at an angle inclined from verticality toward a sidewalk.

An internal space may be formed between a bottom surface disposed on a lower portion of the body unit and the base surface, and a cable for supplying power and transmitting control signals to the LED module may be installed in the internal space.

The body unit may have both end portions in a longitudinal direction formed with a first connection hole and a second connection hole, the cable may have one end portion provided with a first adapter and the other end portion provided with a second adapter, a length between the first adapter and the second adapter is stretchable and contractable, the first adapter may be provided in a state of being drawn out outward through the first connection hole, the second adapter may be disposed in the internal space of the body unit, and the first adapter may be connected to neighboring another walking signal device, and when connected to another walking signal device, inserted into the internal space of the body unit through the second connection hole and connected to the second adapter.

Advantageous Effects of Invention

According to the present disclosure, by classifying the plurality of reflective surfaces of the reflector in a unit of column, separately defining the classified the first column to the $n^{th}$ (n is a natural number) column reflective surface group, and forming the virtual angle of the reflective surface group close to one side that is smaller than the virtual angle of the reflective surface group far from the one side, it is possible to prevent the decrease in luminance even when the distance between the light-emitting surface and the LED device is relatively longer, thereby improving luminance uniformity on the light-emitting surface.

In addition, according to the present disclosure, by providing the walking signal lit on the floor of the crosswalk waiting line, it is possible to prevent the accidents that occur because pedestrians with their heads down while looking at smartphones or the like may not recognize the surrounding situation.

In addition, according to the present disclosure, by fastening the bolt passing through the first and second insertion holes and the bolt hole of the cover unit to the nut provided on the side wall of the body unit, it is possible to firmly couple the body unit to the cover unit and reduce the component manufacturing cost and the product manufacturing cost.

BRIEF DESCRIPTION OF DRAWINGS

FIG. 1 is a view illustrating a state in which a floor-type walking signal device according to an embodiment of the present disclosure is installed by being buried in the ground.

FIG. 2 is a perspective view illustrating the floor-type walking signal device according to the embodiment of the present disclosure.

FIG. 3 is an exploded perspective view illustrating a plan side of the floor-type walking signal device according to the embodiment of the present disclosure.

FIG. 4 is an exploded perspective view illustrating a lower surface side of the floor-type walking signal device according to the embodiment of the present disclosure.

FIG. 5 is an exploded perspective view illustrating a portion of a driving module in a body unit in FIG. 3.

FIG. 6 is an exploded perspective view illustrating a portion of a bottom surface of the body unit in FIG. 4.

FIG. 7 is an enlarged perspective view illustrating a portion of a light emitting diode (LED) module in FIG. 3.

FIG. 8 is a cross-sectional view along line A-A' in FIG. 2.

FIG. 9 is a cross-sectional view illustrating a first modified example in which a coupling structure of the body unit and the cover unit is different.

FIG. 10 is a cross-sectional view illustrating a second modified example in which the coupling structure of the body unit and the cover unit is different.

FIG. 11A is a perspective view illustrating a plan side of a reflector in the floor-type walking signal device according to the embodiment of the present disclosure.

FIG. 11B is a perspective view illustrating a lower surface side of the reflector in the floor-type walking signal device according to the embodiment of the present disclosure.

FIG. 12 is an enlarged cross-sectional view illustrating the reflector in FIG. 8.

FIG. 13 is a cross-sectional view illustrating another modified example in which a reflective surface in FIG. 12 is different.

DESCRIPTION OF EMBODIMENTS

Hereinafter, embodiments of the present disclosure will be described in detail with reference to the accompanying drawings.

FIG. 1 is a view illustrating a state in which a floor-type walking signal device 1 according to an embodiment of the present disclosure is installed by being buried in the ground.

As illustrated in FIG. 1, the plurality of floor-type walking signal devices 1 may be installed by being buried in the ground at one side of a crosswalk curb 30 installed between a road 10 and a sidewalk 20. As will be described below, the plurality of floor-type walking signal devices 1 may be connected in a left-right direction using a cable C (see FIG. 2).

The plurality of floor-type walking signal devices 1 may be electrically connected to a signal controller 2 positioned outside roads or the like and interworked to a crosswalk traffic light (not illustrated). For example, when a red lamp of the crosswalk traffic light is turned on under the control of the signal controller 2, a red light emitting diode (LED) device 221 (see FIG. 7) in the floor-type walking signal device 1 may be turned on together to emit red light. In addition, when a green lamp of the crosswalk traffic light is turned on under the control of the signal controller 2, a green LED device 222 (see FIG. 7) in the floor-type walking signal device 1 may be turned on together to emit green light. As described above, the floor-type walking signal device 1 installed by being buried in the ground may be displayed in red, green, and green flashing by the signal controller 2 so that a pedestrian walking while looking at a mobile phone with his/her head down may recognize a surrounding situation.

FIG. 2 is a perspective view illustrating the floor-type walking signal device according to the embodiment of the present disclosure, FIG. 3 is an exploded perspective view illustrating a plan side of the floor-type walking signal device according to the embodiment of the present disclosure, and FIG. 4 is an exploded perspective view illustrating a lower surface side of the floor-type walking signal device according to the embodiment of the present disclosure.

As illustrated in FIGS. 2 to 4, the floor-type walking signal device 1 according to the embodiment of the present disclosure may include a body unit 100, an LED module 200, a reflector 300, a driving module 400, and a cover unit 500.

The body unit 100 may include a base surface 110 inclined upward from one side to the other side thereof. The inclination of the base surface 110 is to enable the LED module 200 to be installed at an inclined angle of about 10 degrees. The base surface 110 may be formed at a height on the sidewalk 20 side lower than a height on the road 10 side. By installing the LED module 200 on the base surface 110, the signaling light generated from each of the plurality of LED devices 220 of the LED module 200 may be emitted at an angle inclined at an angle of about 10 degrees from verticality toward the sidewalk 20.

Therefore, pedestrians waiting at a signal on the ground between the road 10 and the sidewalk 20 may more easily recognize the light generated from the LED module 200. In addition, it is possible to increase the light directed to the pedestrians while minimizing the interference of the light directed to the driver of the vehicle. In other words, it is possible to further improve the pedestrian's visibility while reducing the driver's driving interference.

A plurality of holes 111 may be formed in the base surface 110 at predetermined intervals. The holes 111 of the base surface 110 may be formed to correspond to installation holes 211 of the LED module 200 and lower protrusions 332 of the reflector 300. In other words, since the lower protrusions 332 of the reflector 300 may be inserted by passing through the installation holes 211 of the LED module 200 and the holes of the base surface 110, the LED module 200 and the reflector 300 may be easily aligned at a predetermined coupling position on the base surface 110. The body unit 100 may be made of polycarbonate, but is not limited thereto.

Meanwhile, the cover unit 500 may be coupled to an upper edge 130 of the body unit 100 and formed with an accommodation space 510 that accommodates the reflector 300 and an upper portion of the body unit 100.

The cover unit 500 may include a rectangular upper plate 520 with a flat upper surface and a side wall 530 extending downward from an edge of the upper plate 520.

The upper plate 520 of the cover unit 500 may have a surface formed with a plurality of anti-slip protrusions 521. The plurality of anti-slip protrusions 521 are for preventing slip and are preferably designed to have a slip resistance of 40 BPN or more.

The cover unit 500 may be made of a light-transmitting material such as polycarbonate and is preferably made of a material to maintain chemical and corrosion resistance. In addition, the cover unit 500 is preferably made of a material to withstand loads and impacts from pedestrians and motorcycles, and in some cases, vehicles and the like, and a thickness of the upper plate 520 may be about 8 mm.

As will be described below, referring to FIG. 8, a long nut N1 may be fitted into the plurality of holes formed at intervals along an edge of an upper portion of the side wall 530 of the cover unit 500. In addition, a plurality of bolt holes 531 may be formed at intervals along an edge of a lower portion of the side wall 530 of the cover unit 500. Upper portions of the plurality of bolt holes 531 may be formed to be connected to the nut N1, and lower portions of the plurality of bolt holes 531 may be formed to be connected to the first insertion holes 131 of the body unit 100. Therefore, a fastener, such as a bolt, fitted into the first insertion hole 131 at a lower end of the body unit 100 may be fastened to the nut N1 by passing through the bolt holes 531 of the cover unit 500, and thus the body unit 100 and the cover unit 500 may be firmly coupled. A coupling structure of the body unit 100 and the cover unit 500 will be described in detail below with reference to FIG. 8.

Referring to FIGS. 3 and 4, a gasket 600 may be interposed between the upper edge 130 of the body unit 100 and a lower end of the cover unit 500 and formed in a ring shape corresponding to the circumference of the lower end of the cover unit 500. For example, the gasket 600 may be provided in a rectangular ring shape. The gasket 600 includes a fastening hole 610 formed along an edge thereof. Since the fastening hole 610 of the gasket 600 is formed to correspond to the first insertion hole 131 of the body unit 100 and the bolt hole 531 of the cover unit 500, the fastening hole 610 may be pressed as a fastener such as a bolt is fastened in a state of being interposed between the cover unit 500 and the body unit 100. The gasket 600 may perform dustproof and waterproof functions for preventing water or contaminants from permeating into a gap between the cover unit 500 and the body unit 100. In other words, when water, moisture, or the like is introduced from the outside, the gasket 600 may be provided to prevent a problem such as a disconnection or a short circuit due to corrosion of circuit patterns formed in the LED module 200 and the driving module 400. As for the gasket 600, a rubber gasket such as EPMD or Viton may be used, but the present disclosure is not limited thereto.

A buffering sheet S may be interposed between an inner surface of the cover unit 500 and an upper surface 320 of the reflector 300 and provided to perform a buffering operation between the inner surface of the cover unit 500 and the upper surface 320 of the reflector 300. The buffering sheet S may be made of a material such as silicon, rubber, or sponge. Since a first hole H1 is formed to correspond to an open upper end portion 321 of the reflector 300, the buffering sheet S does not cover the open upper end portion 321 even when disposed on the upper surface 320 of the reflector 300. In addition, since the buffering sheet S has a second hole H2 formed to correspond to the upper protrusion 322 of the reflector 300, the second hole H2 may be fitted into the upper protrusion 322 of the reflector 300 and thus easily disposed at a predetermined position.

FIG. 5 is an exploded perspective view illustrating a portion of a driving module in a body unit in FIG. 3.

Referring to FIG. 5, the body unit 100 may be formed with an installation groove 120 for installing the driving module 400. The installation groove 120 may be provided as a space between a protective housing 180 and the base surface to which the cable C is connected.

The driving module 400 may be provided to control the driving of the LED module 200, and a plurality of fixing grooves 410 may be formed at intervals at an edge thereof. In addition, the body unit 100 may have a fixing hole 121*a* formed in each of the plurality of installation surfaces 121 provided in the installation groove 120, and the fixing hole 121*a* may be formed to correspond to the fixing groove 410 of the driving module 400. Therefore, the driving module 400 may be detachably coupled to the installation surface 121 of the body unit 100 by a fastener (not illustrated), such as a bolt, passing through the fixing groove 410 and the fixing hole 121*a*.

FIG. 6 is an exploded perspective view illustrating a portion of a bottom surface of the body unit in FIG. 4.

Referring to FIG. 6, the body unit 100 may have a plurality of coupling holes 142 formed at intervals along the circumference of a lower edge 140. The coupling hole 142 is formed for coupling with a bottom surface 150, and the bottom surface 150 may be formed with a through hole 151 corresponding to the coupling hole 142 of the body unit 100. Therefore, the bottom surface 150 may be detachably coupled to the lower edge 140 of the body unit 100 by a fastener (not illustrated), such as a bolt, passing through the through hole 151 and the coupling hole 142.

As described above, the bottom surface 150 disposed on the lower portion of the body unit 100 may cover only a portion of an internal space 160 of the body unit 100 so that the heat transferred from the LED module 200 may be easily dissipated. In other words, the heat generated when the LED device 220 in the LED module 200 emits light may be transferred to a printed circuit board (PCB) 210 of the LED module 200, and the heat of the PCB 210 may be dissipated into the ground through the base surface 110 and the open internal space 160 of the body unit 100.

The bottom surface 150 may be made of synthetic resin or a steel use stainless (SUS) material that does not corrode in moisture to transfer a cold temperature of the ground to the internal space 160 through the bottom surface 150.

The internal space 160 may be formed between the bottom surface 150 disposed on the lower portion of the body unit 100 and the base surface 110. The internal space 160 may be equipped with the cable C for supplying power and transmitting control signals to the LED module 200.

The body unit 100 may have both end portions in a longitudinal direction formed with a first connection hole h1 and a second connection hole h2, and the first and second connection holes h1 and h2 may be formed to be connected to the internal space 160. In addition, the cable C may have one end portion provided with a first adapter CA1 and the other end portion provided with a second adapter CA2, and a length between the first adapter CA1 and the second adapter CA2 may be provided to stretch and contract. Here, the first adapter CA1 may be provided in a state of being drawn out outward through the first connection hole h1, and the second adapter CA2 may be disposed in the internal space 160 of the body unit 100.

Since one floor-type walking signal device 1 is about 30 cm in length, the plurality of floor-type walking signal devices 1 may be installed in a row in the longitudinal direction when installed in the ground. In this case, the cable C may be used to supply power and transmit the control signals between neighboring walking signal devices.

Although not specifically illustrated, when one walking signal device is connected to neighboring another walking signal device, the first adapter CA1 provided on the cable C of the walking signal device may be inserted into the internal space 160 of the body unit 100 through the second connection hole h2 of another walking signal device and connected to the second adapter CA2 provided on the cable C of another walking signal device.

The first adapter CA1 and the second adapter CA2 may each include a pair of first terminals t1 and a pair of second terminals t2. Here, the pair of first terminals t1 may provide power (e.g., a constant voltage of DC 24 V) to the driving module 400, and the pair of second terminals t2 may be formed of an interface for RS-485 communication to transmit traffic light control signals between the driving module 400 and the signal controller 2 (see FIG. 1) on the ground. Here, the traffic light control signals are red ON/OFF, green ON/OFF, and green flashing signals. The driving module 400 may control the driving of each LED device 220 based on the traffic light control signals.

Meanwhile, a pair of cable glands 170 may be provided at both sides of the protective housing 180 disposed in the internal space 160 of the body unit 100. The cable gland 170 may be provided to connect the cable C to the protective housing 180, made of a stainless steel material, and provided with packing or sealing to have a waterproof function. The cable C may be connected to the driving module 400 through the protective housing 180.

FIG. 7 is an enlarged perspective view illustrating a portion of an LED module 200 in FIG. 3.

Referring to FIG. 7, the LED module 200 may have a plurality of LED devices 220 for generating signaling light disposed on one surface of the PCB 210 in a matrix. In the embodiment of the present disclosure, an example in which the LED device 220 is provided as a pair of the red LED device 221 and the green LED device 222, and the pair of LED devices 221 and 222 are disposed in a matrix of 12 rows and 6 columns (72 in total) at equal intervals is described, but the present disclosure is not limited thereto. As an example, the LED device 220 may be provided so that a single device selectively emits red and green light. In addition, the power consumption of the LED device 220 may be in a range of 4.5 to 5 W.

Conventionally, the diode rounded LED device 220 is mainly used, but since the LED device 220 according to the embodiment of the present disclosure is provided as a chip type, a directivity angle is relatively wider than that of the conventional device. Therefore, the floor-type walking signal device 1 according to the embodiment of the present disclosure may adjust an angle of light using the reflector 300 and increase luminance by focusing the light. Since the light generated from the surface of the LED device 220 is reflected by the reflective surface 310 of the reflector 300, when viewed from the pedestrian's vision, not only the LED device 220 but also the reflective surface 310 may be viewed like a light source, thereby significantly expanding a light-emitting area. The reflector 300 may be made of a polycarbonate material, but is not limited thereto. FIG. 8 is a cross-sectional view along line A-A' in FIG. 2.

Referring to FIGS. 3, 4, and 8, the body unit 100 may have the plurality of first insertion holes 131 formed at intervals along the circumference of the upper edge 130, and the plurality of second insertion holes 141 may be formed at intervals along the circumference of the lower edge 140.

The first insertion hole 131 and the second insertion hole 141 may be formed to be connected, and the first insertion hole 131 may be formed to have a smaller diameter than the second insertion hole 141. In other words, a stepped surface f may be formed between the first insertion hole 131 and the second insertion hole 141 due to a difference in diameter.

The body unit 100 and the cover unit 500 may be coupled by a fastener such as a bolt. In the embodiment of the present disclosure, an example in which a bolt is used as a fastener will be described. A bolt B1 may be fitted through the second insertion hole 141 of the body unit 100 to pass through the first insertion hole 131 and fastened to a nut hole N1*a* of the nut N1 by passing through the fastening hole 610 of the gasket 600 and the bolt hole 531 formed on the lower portion of the side wall 530 of the cover unit 500. Here, a head portion h of the bolt B1 may be supported by the stepped surface f between the first insertion hole 131 and the second insertion hole 141. A coupling structure using the bolt B1 and the nut N1 has an advantage of enabling robust connection and reducing the component manufacturing cost and the product manufacturing cost.

FIG. 9 is a cross-sectional view illustrating a first modified example in which a coupling structure of the body unit and the cover unit is different.

Referring to FIG. 9, a nut N2 is not fitted into the upper portion of the side wall 530 of the cover unit 500 and may be horizontally fitted into a nut fitting groove 540 formed in the side wall 530 as marked by the arrow. In this case, the nut N2 may be located at a position at which a nut hole at the center corresponds to the first insertion hole 131 of the body unit 100.

After the nut N2 is fitted into the nut fitting groove 540 as described above, the bolt B2 may be fitted through the second insertion hole 141 of the body unit 100 to pass through the first insertion hole 131 and fastened to the nut hole of the nut N2 by passing through the fastening hole 610 of the gasket 600 and the bolt hole 531 of the cover unit 500. In this case, a head portion h of the bolt B2 may be supported by the stepped surface f between the first insertion hole 131 and the second insertion hole 141.

As described above, a method of inserting the nut N2 into the nut fitting groove 540 and fastening the nut N2 with the bolt B2 enables the robust coupling of the body unit 100 and the cover unit 500 as in the embodiment of FIG. 8.

FIG. 10 is a cross-sectional view illustrating a second modified example in which the coupling structure of the body unit and the cover unit is different.

Referring to FIG. 10, a nut N3 may be provided to be buried into the cover unit 500 when the cover unit 500 is injection-manufactured. The cover unit 500 may be manufactured by plastic injection-molding, and in this case, the nut N3 may be provided to be buried into the side wall 530 of the cover unit 500. As in the first modified example of FIG. 9, a bolt B3 may be fitted through the second insertion hole 141 of the body unit 100 to pass through the first insertion hole 131 and fastened to the nut hole of the nut N3 by passing through the fastening hole 610 of the gasket 600 and the bolt hole 531 of the cover unit 500.

As described above, a method of fastening the bolt B3 to the nut N3 buried into the cover unit 500 has an advantage of enabling a more robust coupling between the body unit 100 and the cover unit 500, but may have a slightly high manufacturing cost.

Referring to FIGS. 8 to 10, the reflector 300 may be disposed on the upper portion of the LED module 200 and may include a plurality of reflective surfaces 310 corresponding to each of the plurality of LED devices 220.

A lower surface 330 of the reflector 300 may be formed as an inclined surface corresponding to the base surface 110 of the body unit 100. The lower surface 330 of the reflector 300 may be disposed to face the inclined base surface 110 of the body unit 100. As described above, the lower surface 330 of the reflector 300 and the base surface 110 may be formed to have corresponding inclinations and disposed to face each other, and an upper surface of the reflector 300 may be disposed horizontally.

The light generated from each of the LED devices 220 may be reflected by the reflective surface 310 of the reflector 300. In this case, the light is not emitted vertically, but may be emitted to the cover unit 500 at an angle inclined at about 10 degrees from verticality toward the sidewalk 20.

Since the inclined angle is inclined toward the sidewalk 20, which is a direction opposite to the direction of the road 10 as described above, the light emitted toward the road 10 may be greatly decreased, and more light may be emitted toward the sidewalk 20. In other words, it is possible to increase the light directed to the pedestrians while minimizing the interference of the light directed to the driver of the vehicle. Therefore, it is possible to reduce the driver's driving interference and further improve the pedestrian's visibility.

FIG. 11A is a perspective view illustrating a plan side of a reflector in the floor-type walking signal device according to the embodiment of the present disclosure, FIG. 11B is a perspective view illustrating a lower surface side of the reflector in the floor-type walking signal device according to the embodiment of the present disclosure, and FIG. 12 is an enlarged cross-sectional view illustrating the reflector in FIG. 8.

As illustrated in FIGS. 11A and 11B, the plurality of reflective surfaces 310 of the reflector 300 may be disposed in a matrix of 12 rows and 6 columns corresponding to the plurality of LED devices 220 disposed in a matrix of 12 rows and 6 columns.

Here, the plurality of reflective surfaces 310 are classified in a unit of column and separately defined as first to $n^{th}$ (n is a natural number) column reflective surface groups sequentially from a position close to one side to a position far from the one side. In the embodiment of the present disclosure, the plurality of reflective surfaces are separately defined as first to sixth column reflective surface groups m1, m2, m3, m4, m5, and m6 in correspondence to the plurality of LED devices 220 disposed in a matrix of 12 rows and 6 columns. In this case, each of the first to sixth column reflective surface groups m1, m2, m3, m4, m5, and m6 is formed to include 12 reflective surfaces 310 disposed adjacent to each other in a row direction, that is, the longitudinal direction of the reflector 300. Specifically, the first column reflective surface group m1 has a total of 12 reflective surfaces 310 disposed in a first column, which is the closest position to one side, and the sixth column reflective surface group m6 has a total of 12 reflective surfaces 310 disposed in a 6th column, which is the farthest position from the one side. In addition, the second to fifth column reflective surface groups m2, m3, m4, and m5 have a total of 12 reflective surfaces 310 disposed in each column.

As illustrated in FIG. 12, each of the first to sixth column reflective surface groups m1, m2, m3, m4, m5, and m6 may include a first wall surface 311 and a second wall surface 312 disposed at an interval in a width direction of the reflector 300. Here, a first virtual line S1 extending downward from the first wall surface 311 and a second virtual line S2 extending downward from the second wall surface 312 form a virtual angle θ at an intersection point.

For example, the first and second virtual lines S1 and S2 of the first column reflective surface group m1 form a first virtual angle θ1 at the intersection point, the first and second virtual lines S1 and S2 of the second column reflective surface group m2 form a second virtual angle θ2, and the first and second virtual lines S1 and S2 of each of the remaining third to sixth column reflective surface groups m3, m4, m5, and m6 form third to sixth virtual angles θ3, 04, 05, and 06 at their intersection points.

In this case, at least two of the first to sixth column reflective surface groups m1, m2, m3, m4, m5, and m6 may have different virtual angles, and as the column reflective surface group is closer to one side, the virtual angle may be formed to be smaller. Preferably, the first to sixth virtual angles θ1, θ2, θ3, θ4, θ5, and θ6 of the first to sixth column reflective surface groups m1, m2, m3, m4, m5, and m6 may be formed differently, and as the column reflective surface group is closer to one side, the virtual angle may be formed to be smaller.

The lower surface 330 of the reflector 300 is formed as an inclined surface corresponding to the inclined base surface 110 of the body unit 100, and the upper surface 320 of the reflector 300 is disposed horizontally. Therefore, lengths of the first and second wall surfaces 311 and 312 of the second column reflective surface group m2 are formed to be shorter than those of the first column reflective surface group m1, and the lengths of the first and second wall surfaces 311 and 312 gradually become shorter toward the sixth reflective surface group m6. In other words, a distance between the upper surface 320 of the reflector 300, which is a light-emitting surface, and the lower surface 330 of the reflector 300, which is in contact with the LED module 200, gradually becomes shorter from the first column reflective surface group m1 to the sixth column reflective surface group m6.

Among the first to sixth column reflective surface groups m1, m2, m3, m4, m5, and m6, the sixth column reflective surface group m6 appears brightest because the distance between the light-emitting surface and the LED device 220 is the shortest, and the first column reflective surface group m1 appears relatively less bright because the distance between the light-emitting surface and the LED device 220 is longer than the sixth column reflective surface group m6.

Therefore, the floor-type walking signal device 1 according to the embodiment of the present disclosure may be formed so that the first to sixth virtual angles θ1, θ2, θ3, θ4, θ5, and θ6 of the first to sixth column reflective surface groups m1, m2, m3, m4, m5, and m6 may be formed to have the relationship "θ1<θ2<θ3<θ4<θ5<θ6." In other words, since the first virtual angle θ1 of the first column reflective surface group m1 is formed to be smaller than the sixth virtual angle θ6 of the sixth column reflective surface group m6, light may be emitted in a denser state even when the distance between the light-emitting surface and the LED device 220 is formed to be longer.

The open upper end portions 321 of the first to sixth column reflective surface groups m1, m2, m3, m4, m5, and m6 may be all formed to have the same area, and the open lower end portions 331 of the first to sixth column reflective surface groups m1, m2, m3, m4, m5, and m6 may be all formed to have the same area.

In addition, the open upper end portions 321 of the first to sixth column reflective surface groups m1, m2, m3, m4, m5, and m6 may be all formed to have the same width, and the open lower end portions 331 of the first to sixth column reflective surface groups m1, m2, m3, m4, m5, and m6 may be all formed to have the same width.

In the floor-type walking signal device 1, there is a problem in that since the LED module 200 is installed on the inclined base surface 110 and disposed to be tilted at a standardized angle, the distance between the light-emitting surface and the LED device 220 is different, thereby making the luminance uneven.

In order to solve this, when the open upper end portions 321 of the first to sixth column reflective surface groups m1, m2, m3, m4, m5, and m6 are all formed to have the same area or width and the open lower end portions 331 of the first to sixth column reflective surface groups m1, m2, m3, m4, m5, and m6 are all formed to have the same area or width, as the lengths of the first wall surface 311 and the second wall surface 312 are increased, the virtual angle may become smaller. In other words, since the lengths of the first wall surface 311 and the second wall surface 312 are further increased from the sixth column reflective surface group m6 close to the road 10 to the first column reflective surface group m1 relatively closer to the sidewalk 20, the virtual angle may become smaller. In other words, since the virtual angles are formed to gradually become smaller to have the relationship of "θ1<θ2<θ3<θ4<θ5<θ6" from the sixth column reflective surface group m6 to the first column reflective surface group m1, the light may be emitted in a denser state toward the first column reflective surface group m1. As described above, even when the distance between the light-emitting surface and the LED device 220, that is, an optical path, is relatively longer, the luminance is not reduced, and thus it is possible to improve the luminance uniformity on the light-emitting surface.

In addition, the open upper end portions 321 of the first to sixth column reflective surface groups m1, m2, m3, m4, m5, and m6 may be all formed to have greater areas than the open lower end portions 331 of the first to sixth column reflective surface groups m1, m2, m3, m4, m5, and m6. In addition, the open upper end portions 321 of the first to sixth column reflective surface groups m1, m2, m3, m4, m5, and m6 may be formed to have greater widths than the open lower end portions 331 of the first to sixth column reflective surface groups m1, m2, m3, m4, m5, and m6.

FIG. 13 is a cross-sectional view illustrating another modified example in which a reflective surface in FIG. 12 is different.

Referring to FIG. 13, a first wall surface 311' and a second wall surface 312' of each of the first to sixth column reflective surface groups m1, m2, m3, m4, m5, and m6 may be formed to be inclined in a direction that moves away upward with respect to a vertical line L passing through the open upper end portions and lower end portions of each of the first to sixth column reflective surface groups m1, m2, m3, m4, m5, and m6.

A reflector 300' is manufactured by injection-molding, and when the first wall surface 311' and the second wall surface 312' are formed to be inclined in a direction closer upward with respect to the vertical line L, it is difficult to easily remove a molded component (not illustrated) from the upper side when the molded component inserted to form the first and second wall surfaces 311' and 312' tries to be removed after the reflector 300' is molded. On the other hand, when the first wall surface 311' and the second wall surface 312' are formed to be inclined in a direction that moves away upward with respect to the vertical line L, the molded component may be easily removed from the upper side.

According to the floor-type walking signal device according to the embodiment of the present disclosure, it is possible to improve the luminance uniformity on the light-emitting surface because the luminance is not decreased even when the distance between the light-emitting surface and the LED device, that is, the optical path is relatively longer.

In addition, according to the floor-type walking signal device according to the embodiment of the present disclosure, when repair or replacement is required in a state in which the floor-type walking signal device is installed by being buried in the ground, it is possible to easily repair or replace the reflector, the LED module, and the like by releasing the bolt or the like and separating the cover unit, thereby facilitating maintenance.

The best embodiments of the present disclosure have been disclosed in the drawings and the specification. Here, although specific terms are used, they are used only for the purpose of describing the present disclosure and are not used to limit the meaning or scope of the present disclosure described in the claims. Therefore, those skilled in the art will understand that various modifications and equivalent embodiments are possible from the present disclosure. Therefore, the true technical scope of the present disclosure should be determined by the technical spirit of the appended claims.

The invention claimed is:

1. A floor-type walking signal device installed by being buried in the ground between a road and a sidewalk, comprising:

a body unit including a base surface inclined upward from one side to the other side;

a light emitting diode (LED) module which is installed on the base surface of the body unit and on which a plurality of LED devices configured to generate signaling light are disposed in a matrix; and a reflector disposed on an upper portion of the LED module and including a plurality of reflective surfaces corresponding to each of the plurality of LED devices, wherein the plurality of reflective surfaces are classified in a unit of column and separately defined as first to $n^{th}$ (n is a natural number) column reflective surface groups sequentially from a position close to one side to a position far from the one side, each of the first to $n^{th}$ column reflective surface groups includes a first wall surface and a second wall surface disposed at intervals in a width direction of the reflector, a first virtual line extending downward from the first wall surface and a second virtual line extending downward from the second wall surface form a virtual angle at an intersection point, and at least two of the first to $n^{th}$ column reflective surface groups have different virtual angles, and as the column reflective surface group is closer to the one side, the virtual angle is formed to be smaller.

2. The floor-type walking signal device of claim 1, wherein each of the first to $n^{th}$ column reflective surface groups is formed to have a different virtual angle.

3. The floor-type walking signal device of claim 1, wherein open upper end portions of the first to $n^{th}$ column reflective surface groups all have the same area.

4. The floor-type walking signal device of claim 1, wherein open lower end portions of the first to $n^{th}$ column reflective surface groups all have the same area.

5. The floor-type walking signal device of claim 1, wherein open upper end portions of the first to $n^{th}$ column reflective surface groups all have the same width, and open lower end portions of the first to $n^{th}$ column reflective surface groups all have the same width.

6. The floor-type walking signal device of claim 1, wherein the first wall surface and the second wall surface of each of the first to $n^{th}$ column reflective surface groups are inclined in a direction that moves away upward with respect to a vertical line passing through the open upper end portion and lower end portion of each of the first to $n^{th}$ column reflective surface groups.

7. The floor-type walking signal device of claim 1, wherein a lower surface of the reflector is formed as an inclined surface corresponding to the base surface of the body unit, and the lower surface of the reflector and the base surface are disposed to face each other, and an upper surface of the reflector is disposed horizontally.

8. The floor-type walking signal device of claim 1, further comprising: a cover unit coupled to an upper edge of the body unit and accommodating the reflector and an upper portion of the body unit; and a gasket interposed between an upper edge of the body unit and a lower end of the cover unit and configured to block the introduction of external moisture.

9. The floor-type walking signal device of claim 8, further comprising a buffering sheet interposed between an inner surface of the cover unit and an upper surface of the reflector and configured to perform a buffering operation.

10. The floor-type walking signal device of claim 8, wherein a plurality of anti-slip protrusions are formed to protrude from an upper surface of the cover unit.

11. The floor-type walking signal device of claim 8, wherein the cover unit includes a nut on a side wall thereof, the body unit is formed with a plurality of first insertion holes at intervals along a circumference of an upper edge thereof and a plurality of second insertion holes at intervals along a circumference of a lower edge thereof, and a bolt fitted into the second insertion hole of the body unit is fastened to the nut of the cover unit by passing through the first insertion hole.

12. The floor-type walking signal device of claim 11, wherein the first insertion hole is formed to have a smaller diameter than the second insertion hole to form a stepped surface therebetween, and a head portion of the bolt is supported by the stepped surface between the first insertion hole and the second insertion hole.

13. The floor-type walking signal device of claim 11, wherein the cover unit includes a nut fitting groove formed in the side wall thereof, and the nut is fitted into the nut fitting groove in a horizontal direction so that a nut hole at the center is located at a position corresponding to the first insertion hole.

14. The floor-type walking signal device of claim 1, wherein signaling light generated from each of the plurality of LED devices is emitted at an angle inclined from verticality toward a sidewalk.

15. The floor-type walking signal device of claim 1, wherein an internal space is formed between a bottom surface disposed on a lower portion of the body unit and the base surface, and a cable for supplying power and transmitting control signals to the LED module is installed in the internal space.

16. The floor-type walking signal device of claim 15, wherein the body unit has both end portions in a longitudinal direction formed with a first connection hole and a second connection hole, the cable has one end portion provided with a first adapter and the other end portion provided with a second adapter, and a length between the first adapter and the second adapter is stretchable and contractable, the first adapter is provided in a state of being drawn out outward through the first connection hole, and the second adapter is disposed in the internal space of the body unit, and the first adapter is connected to neighboring another walking signal device, and when connected to another walking signal device, inserted into the internal space of the body unit through the second connection hole and connected to the second adapter.

* * * * *